May 5, 1931.　　　E. ALTENKIRCH　　　1,803,318
ABSORPTION MACHINE
Filed April 6, 1929
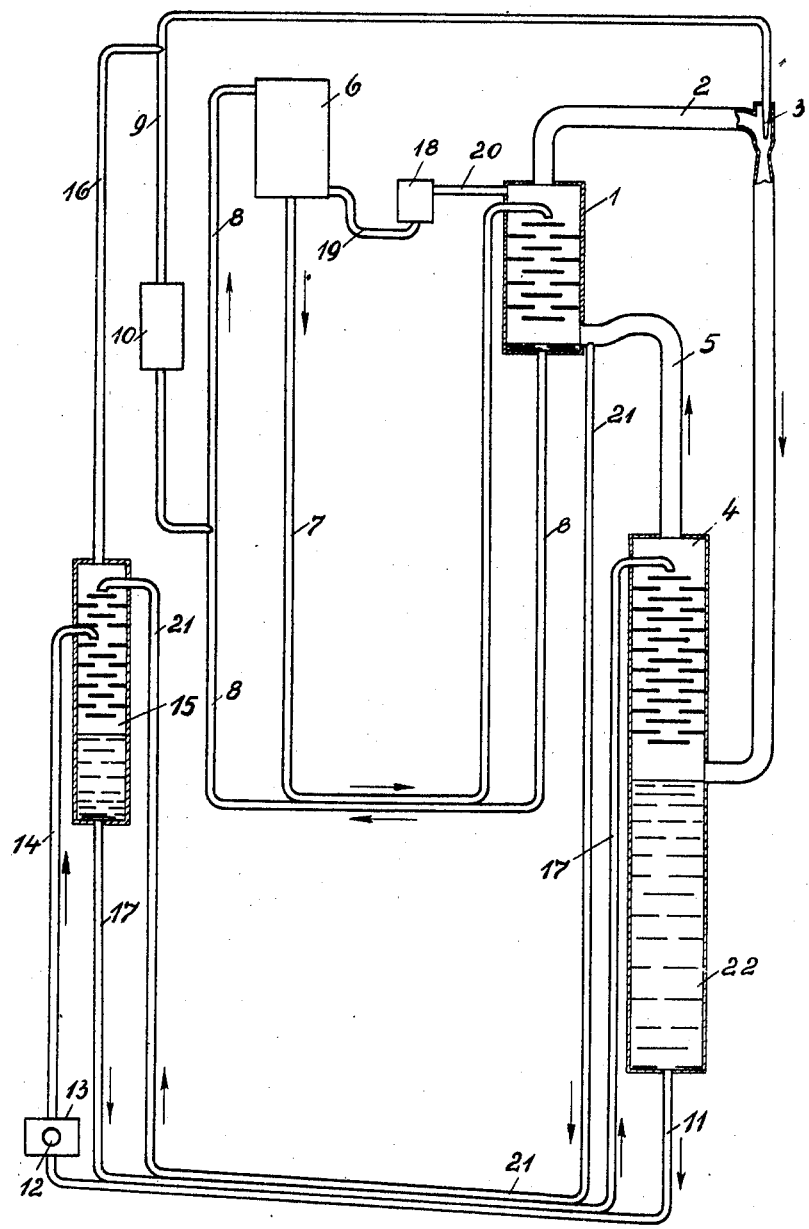
Inventor
Edmund Altenkirch
by Knight Bro.
attorneys Patented May 5, 1931

1,803,318

UNITED STATES PATENT OFFICE

EDMUND ALTENKIRCH, OF NEUENHAGEN, NEAR BERLIN, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

ABSORPTION MACHINE

Application filed April 6, 1929, Serial No. 353,073, and in Germany April 10, 1928.

My invention relates to improvements in absorption machines.

In continuously operating absorption machines, more particularly those serving for refrigerating purposes, the working medium traverses in a closed cycle the following chambers: a chamber in which it is expelled from an absorption solution, a chamber in which it is condensed, a chamber in which it is evaporated and finally a chamber in which it is absorbed again by the solution. As a rule the condensation is effected at a higher pressure and the cold is produced by the evaporation of the condensate at a lower pressure. There are, however, also known absorption machines in which the condensation of the expelled working medium is effected by absorption and its evaporation by evaporating the absorption liquid. Such machines are, for instance, described in the "Zeitschrift für die gesamte Kälteindustrie", vol. 1913, pages 114 to 119. In absorption machines of the last mentioned type the absorption medium thus traverses in succession a generator or boiler, a reabsorber, an evaporator and an absorber. In the absorber and evaporator an inert auxiliary gas may be admixed with the gaseous working medium and the following process then takes place:

The gaseous working medium developed in the generator by the application of heat is absorbed in the reabsorber by an absorption solution, whereupon it evaporates from the strong absorption solution in the evaporator into the admixed inert gas, while the working medium is again absorbed from the gas mixture in the absorber. Such an absorption machine is, for instance, described in the British patent specification 251251.

In all absorption machines which possess instead of the condenser and the generator, a reabsorber and an evaporator, the weak absorption solution produced in the evaporator is returned into the reabsorber. The strong solution from the absorber passes into the generator, from which the weak solution produced by the emission of gas returns into the absorber. Besides the cycle of the working medium there exist thus in such machines, which as distinguished from condensing absorption machines are also called reabsorption machines, two separate cycles or circuits of liquid, viz. between the absorber and the generator on the one hand (absorber system) and the reabsorber and the evaporator on the other hand (reabsorber system). A connecting pipe leads from the reabsorber system to the absorber system, through which surplus quantities of liquid accumulating in the reabsorber return to the absorber system.

In an absorption machine of the aforesaid type there exists in normal operation a certain quantity of absorption solution in the absorber system and a certain other quantity of absorption liquid in the reabsorber system. Such machines are liable to breakdowns in operation, the main cause of which has been traced to variations in the cooling conditions of the reabsorber, the defects becoming the more prominent the greater the quantity of liquid existing in the reabsorber system is in proportion to the quantity of liquid contained in the absorber system.

If, for instance, in consequence of changed cooling conditions the temperature of the reabsorber drops, a comparatively large quantity of the working medium is taken up and detained by the absorption solution contained in the reabsorber. Simultaneously solution returns in increased quantity into the absorber system through the self-flushing pipe. The solvent contained in this solution remains in the absorber system, while the working medium is driven out again, returns into the reabsorber system and there again displaces solvent in the manner described. The solution in the absorber system thus becomes weaker in working medium to the extent at which the solution in the reabsorber system increases in concentration. In consequence thereof the heat of evaporation rises and a comparatively large quantity of solvent is also evaporated. This involves an undesired loss of heat by evaporation, heat and increased radiation. In particularly unfavorable cases the reduction of the concentration of the absorption solution in the absorber system may go so far as to cause the stopping of the operation altogether.

The conditions become particularly unfavorable, if, by starting a fan effecting the cooling of the reabsorber, for instance, a vacuum is suddenly set up in the reabsorber, so that the return of surplus quantities of liquid into the absorber system is temporarily interrupted. The quantity of liquid in the absorber system is then quickly reduced and the circulation of the liquid stops.

Extensive experiments and researches have now shown that all these drawbacks may be eliminated completely, if the quantities of liquid existing in the absorber system on the one hand and in the reabsorber on the other hand are apportioned in a certain manner in relation to each other.

I have shown in the accompanying drawing a type of machine referred to hereinbefore and to which my improvements are applied. This particular type forms the subject matter of my copending application, Serial No. 141,929 filed October 16, 1926, of which the present application is a continuation in part, so far as the general arrangement and functioning of elements are concerned, the particular novel features being in the present case the specific quantitative apportioning of the liquid in the two parts of the system aforementioned.

This apportioning is according to my invention attained by making the quantity of liquid contained in the absorber system greater than that in the reabsorber system. If the ratio of the two quantities of liquid is raised up to the value 2:1, it is already possible to adapt the conditions fairly closely to the fluctuations in the room temperature occurring in practice. The principal point is that the quantity of the solution in the absorber system is made so much larger than the quantity of the solution in the reabsorber system, that the variations of the concentration of the solution in the absorber system, which occur during the operation in consequence of changes in the cooling conditions of the reabsorber remain within the permissible limits for the maintenance of a continuous operation. Preferably the surplus of absorption solution necessary in the absorber system is accommodated in the form of a store of liquid in the run of the line, which conveys the strong solution flowing from the absorber into the evaporator. The reserve of working medium stored in the absorber system becomes largest in this way for a given size machine.

An embodiment of my invention is diagrammatically illustrated in the drawing affixed hereto and forming part of my specification. This drawing shows an air-cooled reabsorption machine, containing an admixed inert or neutral gas in which the expelled working medium, before it reaches the reabsorber, traverses a gas separator designed as rectifier, and in which furthermore a portion of the expelled working medium is introduced into the gas mixture pipe for the purpose of effecting the circulation of the gas mixture through the absorber and the evaporator.

From this drawing it will be observed, that into the pipe 2 issuing from the evaporator 1 enters through the nozzle 3 in well known manner the vapor effecting the circulation of the gas mixture. The gas mixture passes into the absorber 4 from the upper part of which the gas mixture poor in working medium returns into the evaporator 1 through the pipe 5. The liquid working medium necessary for charging the evaporator flows from the reabsorber 6 to the evaporator 1 through a U-shaped pipe 7. Through a pipe 8, forming a heat interchanger with the pipe 7, the weak refrigerating liquid returns into the reabsorber 6. Into the ascending portion of the pipe 8 opens a pipe 9 containing a pressure maintaining tank 10. The gas passed into the reabsorber 6 through this pipe effects the conveyance of the liquid from the evaporator to the reabsorber. From the lower part of absorber 4 the strong refrigerating liquid passes through a pipe 11 into the generator or boiler 13 adapted to be heated by an electric heating cartridge 12. By means of an ascending pipe 14 the liquid is conveyed into the gas separator 15 by the action of the gas bubbles contained in it.

This gas separator is in communication through a pipe 16 with the pipe 9 mentioned before, and the extension of which terminates in the nozzle 3. From the gas separator 15 the weak liquid is returned into the absorber 4 by a pipe 17 forming a heat interchanging device in conjunction with the pipe 11. From the pipe 5 conveying the gas mixture to the evaporator branches closely adjacent to its opening into the evaporator 1 a U-shaped pipe 21, the left hand rising portion of which opens into the rectifier space of the gas separator 15. This pipe serves for the return of surplus quantities of liquid, which have accumulated in the evaporator 1, into the gas separator, where they are utilized for drying vapors.

Between the reabsorber 6 and the evaporator 1 is provided a venting device 18, 19, 20, which enables quantities of non-absorbable gas entrained into the reabsorber 6 to return into the gas circulation system.

The absorber 4 is at its bottom provided with an extension, which serves for the reception of a store 22 of strong absorption solution. This store is so dimensioned, that the total quantity of the solution circulating in the absorber system (4, 22, 11, 13, 14, 15, 17) amounts to a multiple of the solution circulating in the reabsorber system (6, 7, 1, 8).

In absorption machines in which, as in the modification described by way of example, a rectifier is connected in front of the evaporator, the store of liquid 22 is preferably accommodated at about the height of the level of the liquid contained in the rectifier. This ensures that even if the return of absorption solution from the reabsorber into the absorber system should temporarily fail, the depth of immersion of the evaporator becomes less very gradually only and an excessively great reduction of the concentration of the absorption solution existing in the absorber system does not take place.

This provision is also of value in case cooling conditions develop, which necessitate an increase in the absorption temperature. In this case the distribution of the quantities of liquid over the two systems according to my invention prevents the concentration of the absorption solution in the evaporator from becoming excessively strong, which would cause a reduction of the absorption action in the absorber.

If in the manner described care is taken, that the quantity of liquid existing in the absorption system is at all times larger than the quantity existing in the reabsorber system, and if the ratio specified of the two quantities of liquid is approximately maintained, the concentration of the solution in the absorber system can never fluctuate so widely, that disturbances in the refrigerating process or breakdowns in the absorption machine would occur.

Various modifications and changes may be made without departing from the spirit and the scope of the invention.

I claim as my invention:

1. An absorption machine, having two bodies of absorption solution each consisting of a binary mixture of a liquid solvent and a gaseous working medium, a generator for expelling working medium from the absorption solution, a reabsorber for the absorption of working medium into the absorption solution, an evaporator for evaporating the working medium out of the absorption solution, an absorber for absorbing working medium into the absorption solution, a pipe for leading gaseous working medium from said generator to said reabsorber, a pipe for leading gaseous working medium from said evaporator to said absorber, a pipe for leading weak absorption solution from said generator to said absorber, a pipe for returning strong absorption solution from said absorber into said generator, a pipe for leading strong absorption solution from said reabsorber into said evaporator, a pipe for returning weak absorption solution from said evaporator into said reabsorber, means for effecting a circulation of one body of absorption solution through said generator and said absorber, means for effecting a circulation of the other body of absorption solution through said evaporator and said reabsorber, the quantity of the liquid of the body circulating through said generator and said absorber being larger than the quantity of the liquid of the body circulating through said evaporator and said reabsorber.

2. An absorption machine, having two bodies of absorption solution each consisting of a binary mixture of a liquid solvent and a gaseous working medium, a generator for expelling working medium from the absorption solution, a reabsorber for the absorption of working medium into the absorption solution, an evaporator for evaporating the working medium out of the absorption solution, an absorber for absorbing working medium into the absorption solution, a pipe for leading gaseous working medium from said generator to said reabsorber, a pipe for leading gaseous working medium from said evaporator to said absorber, a pipe for leading weak absorption solution from said generator to said absorber, a pipe for returning strong absorption solution from said absorber into said generator, a pipe for leading strong absorption solution from said reabsorber into said evaporator, a pipe for returning weak absorption solution from said evaporator into said reabsorber, means for effecting a circulation of one body of absorption solution through said generator and said absorber, means for effecting a circulation of the other body of absorption solution through said evaporator and said reabsorber, the quantity of the liquid of the body circulating through said generator and said absorber being about twice as large as the quantity of the liquid of the body circulating through said evaporator and said reabsorber.

3. An absorption machine, having two bodies of absorption solution each consisting of a binary mixture of a liquid solvent and a gaseous working medium, a generator for expelling working medium from the absorption solution, a reabsorber for the absorption of working medium into the absorption solution, an evaporator for evaporating the working medium out of the absorption solution, an absorber for absorbing working medium into the absorption solution, a pipe for leading gaseous working medium from said generator to said reabsorber, a pipe for leading gaseous working medium from said evaporator to said absorber, a pipe for leading weak absorption solution from said generator to said absorber, a pipe for returning strong absorption solution from said absorber into said generator, a pipe for leading strong absorption solution from said reabsorber into said evaporator, a pipe for returning weak absorption solution from said evaporator into said reabsorber, means for effecting a circulation of one body of absorption solution through said generator and said absorber, means for effecting a circulation of the other body of absorption solution through said evaporator and said reabsorber, the quantity of the liquid of the body circulating through said generator and said absorber being larger than the quantity of the liquid of the body circulating through said evaporator and said reabsorber, the surplus of the quantity of liquid of one body over the other being stored up in the run of the pipe conducting the strong absorption solution from said absorber to said generator.

4. An absorption machine, having two bodies of absorption solution each consisting of a binary mixture of a liquid solvent and a gaseous working medium, a generator for expelling working medium from the absorption solution, a reabsorber for the absorption of working medium into the absorption solution, an evaporator for evaporating the working medium out of the absorption solution, an absorber for absorbing working medium into the absorption solution, a pipe for leading gaseous working medium from said generator to said reabsorber, a pipe for leading gaseous working medium from said evaporator to said absorber, a pipe for leading weak absorption solution from said generator to said absorber, a pipe for returning strong absorption solution from said absorber into said generator, a pipe for leading strong absorption solution from said reabsorber into said evaporator, a pipe for returning weak absorption solution from said evaporator into said reabsorber, means for effecting a circulation of one body of absorption solution through said generator and said absorber, means for effecting a circulation of the other body of absorption solution through said evaporator and said reabsorber, the quantity of the liquid of the body circulating through said generator and said absorber being larger than the quantity of the liquid of the body circulating through said evaporator and said reabsorber, the surplus of the quantity of liquid of one body over the other being stored up in the run of the pipe conducting the strong absorption solution from said absorber to said generator, and a gas separator designed as rectification vessel for gaseous working medium and located in the run of the pipe conducting weak solution from said generator to said absorber, said surplus of liquid accommodated in a part of the pipe conducting strong solution from said absorber to said generator located at a substantially equal height as the liquid level of the solution contained in said rectification vessel.

5. An absorption machine, having two bodies of absorption solution each consisting of a binary mixture of a liquid solvent and a gaseous working medium, a generator for expelling working medium from the absorption solution, a reabsorber for the absorption of working medium into the absorption solution, an evaporator for evaporating the working medium out of the absorption solution, an absorber for absorbing working medium into the absorption solution, a pipe for leading gaseous working medium from said generator to said reabsorber, a pipe for leading gaseous working medium from said evaporator to said absorber, a pipe for leading weak absorption solution from said generator to said absorber, a pipe for returning strong absorption solution from said absorber into said generator, a pipe for leading strong absorption solution from said reabsorber into said evaporator, a pipe for returning weak absorption solution from said evaporator into said reabsorber, means for effecting a circulation of one body of absorption solution through said generator and said absorber, means for effecting a circulation of the other body of absorption solution through said evaporator and said reabsorber, the quantity of the liquid of the body circulating through said generator and said absorber being larger than the quantity of the liquid of the body circulating through said evaporator and said reabsorber, the surplus of the quantity of liquid of one body over the other being stored up in the run of the pipe conducting the strong absorption solution from said absorber to said generator, and a gas separator designed as rectification vessel for gaseous working medium and located in the run of the pipe conducting weak solution from said generator to said absorber, said surplus of liquid accommodated in a part of the pipe conducting strong solution from said absorber to said generator located at a substantially equal height as the liquid level of the solution contained in said rectification vessel, and a pipe connecting said evaporator with said rectification vessel for returning surplus quantities of liquid accumulated in said evaporator from the circulation system of the liquid body less in quantity into the other circulation system.

6. An absorption machine, having two bodies of absorption solution each consisting of a binary mixture of a liquid solvent and a gaseous working medium, a generator for expelling working medium from the absorption solution, a reabsorber for the absorption of working medium into the absorption solution, an evaporator for evaporating the working medium out of the absorption solution, an absorber for absorbing working medium into the absorption solution, a pipe for leading gaseous working medium from said generator to said reabsorber, a pipe for leading gaseous working medium from said evaporator to said absorber, a pipe for leading weak absorption solution from said generator to said absorber, a pipe for returning strong absorption solution from said absorber into said generator, a pipe for leading strong absorption solution from said reabsorber into said evaporator, a pipe for returning weak absorption solution from said evaporator into said reabsorber, means for effecting a circulation of one body of absorption solution through said generator and said absorber, means for effecting a circulation of the other body of absorption solution through said evaporator and said reabsorber, the quantity of the liquid of the body circulating through said generator and said absorber being larger than the quantity of the liquid of the body circulating through said evaporator and said reabsorber, the surplus of the quantity of liquid of one body over the other being stored up in the run of the pipe conducting the strong absorption solution from said absorber to said generator, and a gas separator designed as rectification vessel for gaseous working medium and located in the run of the pipe conducting weak solution from said generator to said absorber, said surplus of liquid accommodated in a part of the pipe conducting strong solution from said absorber to said generator located at a substantially equal height as the liquid level of the solution contained in said rectification vessel, and a pipe connecting said evaporator with said rectification vessel for returning surplus quantities of liquid accumulated in said evaporator from the circulation system of the liquid body less in quantity into the other circulation system, an inert nonabsorbable gas admixed with the gaseous working medium in said absorber and said evaporator, a gas pipe between said absorber and said evaporator, and means for effecting the circulation of the gas mixture through said absorber and said evaporator evaporator.

7. An absorption machine, having two bodies of absorption solution each consisting of a binary mixture of a liquid solvent and a gaseous working medium, a generator for expelling working medium from the absorption solution, a reabsorber for the absorption of working medium into the absorption solution, an evaporator for evaporating the working medium out of the absorption solution, an absorber for absorbing working medium into the absorption solution, a pipe for leading gaseous working medium from said generator to said reabsorber, a pipe for leading gaseous working medium from said evaporator to said absorber, a pipe for leading weak absorption solution from said generator to said absorber, a pipe for returning strong absorption solution from said absorber into said generator, a pipe for leading strong absorption solution from said reabsorber into said evaporator, a pipe for returning weak absorption solution from said evaporator into said reabsorber, means for effecting a circulation of one body of absorption solution through said generator and said absorber, means for effecting a circulation of the other body of absorption solution through said evaporator and said reabsorber, the quantity of the liquid of the body circulating through said generator and said absorber being larger than the quantity of the liquid of the body circulating through said evaporator and said reabsorber, the surplus of the quantity of liquid of one body over the other being stored up in the run of the pipe conducting the strong absorption solution from said absorber to said generator, and a gas separator designed as rectification vessel for gaseous working medium and located in the run of the pipe conducting weak solution from said generator to said absorber, said surplus of liquid accommodated in a part of the pipe conducting strong solution from said absorber to said generator located at a substantially equal height as the liquid level of the solution contained in said rectification vessel, and a pipe connecting said evaporator with said rectification vessel for returning surplus quantities of liquid accumulated in said evaporator from the circulation system of the liquid body less in quantity into the other circulation system, an inert nonabsorbable gas admixed with the gaseous working medium in said absorber and said evaporator, a gas pipe between said absorber and said evaporator, and means for effecting the circulation of the gas mixture through said absorber and said evaporator, and means located between said reabsorber and said evaporator for discharging entrained quantities of non-absorbable gases from said reabsorber into said evaporator, said means comprising a liquid seal.

In testimony whereof I affix my signature.
EDMUND ALTENKIRCH.